United States Patent [19]

Bourne et al.

[11] Patent Number: 4,609,876

[45] Date of Patent: Sep. 2, 1986

[54] SHORT RADIATION PULSE GENERATION

[75] Inventors: Orson L. Bourne, Vanier; A. John Alcock, Gloucester, both of Canada

[73] Assignee: Canadian Patents and Development Limited, Ottawa, Canada

[21] Appl. No.: 604,120

[22] Filed: Apr. 26, 1984

[51] Int. Cl.$^4$ .............................................. H01S 3/30
[52] U.S. Cl. ..................................... 330/4.3; 307/425; 350/359
[58] Field of Search ........................ 330/4.3; 332/7.51; 350/359; 307/425

[56] References Cited

U.S. PATENT DOCUMENTS

| | | | |
|---|---|---|---|
| 3,940,713 | 2/1976 | Hughes | 372/20 |
| 3,979,694 | 9/1976 | Goldhar et al. | 330/4.3 |
| 4,401,920 | 8/1983 | Taylor et al. | 315/150 |
| 4,484,106 | 11/1984 | Taylor et al. | 315/150 |
| 4,490,651 | 12/1984 | Taylor et al. | 315/150 |

FOREIGN PATENT DOCUMENTS 0042521  1/1982  European Pat. Off. ............. 330/4.3

OTHER PUBLICATIONS

Armandillo et al, "Highly Efficient . . . Brillouin Scattering", 10/83, pp. 523–525, Opt. Lett., vol. 8, #10.
Tomov et al, Microsecond Gain . . . XeF Laser Line", 12/77, pp. 747–749, Appl. Phys. Lett., vol. 31, #11.
Gower, "KrF Laser . . . Brillouin Retroreflectors", 9/84, pp. 423–425, Opt. Lett., vol. 7, #9.
Damzen et al, High–Efficiency . . . Brillouin Scattering", 6/83, pp. 313–315, Optics Lett., vol. 8, #6.
Andrew et al, "Nonstationary Stimulated . . . Conditions", 10/83, pp. 688–692, Sov. Physi.–Jetp, vol. 58, #4; abstract only.
Kormer et al, "Application of . . . Pulses Fusion", 4/82, pp. 1079–1091, Sov. Phys. Jetp., vol. #4; abst.
Kormer et al, "Pulse Shaping . . . Fusion", 1/81, pp. 13–14, Sov. Tech. Phys. Lett., vol. 7, #1; abst.
Dudov et al, "Investigation of . . . Pulses", 4/81, pp. 363–368, Jetp Lett., vol. 33, #7, abst.
Bourne et al, "Subnanosecond-Pulse Generation at 308 and 450 nm by Truncated Stimulated Brillouin Scattering", 9/84, pp. 411–413, Optics Letters, vol. 9, #9.

*Primary Examiner*—Nelson Moskowitz
*Attorney, Agent, or Firm*—Edward Rymek; Yoshiharu Toyooka

[57] ABSTRACT

Laser pulse generation techniques are disclosed in which two competing non-linear processes, e.g. stimulated Brillouin scattering and laser-induced breakdown are employed in combination to generate a short laser pulse. Narrow linewidth UV radiation amplified to the millijoule level in a XeCl discharge module has been used to generate pulses of less than 200 picoseconds in duration.

18 Claims, 6 Drawing Figures

SHORT RADIATION PULSE GENERATION

This invention relates to short laser pulse generation and, more particularly, to a laser pulse generation technique in which two non-linear processes, e.g. stimulated Brillouin scattering and laser-induced breakdown, are employed in combination to generate a short laser pulse.

BACKGROUND OF THE INVENTION

There has been and is a considerable interest in the development of laser pulse generators which can produce radiation pulses of a very short duration, e.g. less than a nanosecond.

In the past, a number of different approaches have been used for generation of short pulses and following is a brief description of a few of these earlier methods.

One approach is described in the U.S. Pat. No. 3,979,694, issued Sept. 7, 1976 (Goldhar et al). This patent makes use of the laser-induced breakdown of gases. Laser pulses of the order of 0.1 nanoseconds are produced by means of a gas breakdown switch.

Other methods involved electro-optical pulse slicing and mode-locking techniques.

Excimer lasers are now well established as reliable, relatively efficient sources of high power radiation. An important feature of the excimer lasers is the broad amplifying bandwidth which they exhibit, e.g. the XeCl laser provides gain over a wavelength range of approximately 15 Å. Amplification over such a broad spectral width suggests the possibility of generating extremely short pulses. As a result, a considerable effort has been devoted to the investigation of ultrashort pulse generation with excimer lasers.

Electro-optical pulse slicing for the production of subnanosecond excimer pulses has been reported in the publication by D. A. Jaroszynski and T. A. King, J. Phys. E: Sci. Instrum., 16, 862, 1983. However, this technique requires a fast, low jitter switch and, although pulses of 400 ps duration have been produced with the aid of krytrons, such devices are not suitable for high repetition rate systems.

Mode-locking techniques also have been employed for a generation of short pulses by excimer lasers. Both active and passive mode-locking techniques have been used. However, the simultaneous use of passive and active mode-locking in a XeCl oscillator has provided the shortest pulses (300 ps) reported to date, as seen in the publication by M. Watanabe, S. Watanabe and A. Endoh, Optics Letters, Vol. 8, p. 638, 1983. This technique, however, requires a laser medium which exhibits gain for more than 150 nanoseconds.

There has also been demonstrated the use of an excimer laser functioning as an amplifier or regenerative amplifier of pulses produced by an auxiliary mode-locked laser (see: Applied Physics Letters, 31, p. 747, 1977, by I. V. Tomov et al). Such systems, although they have produced picosecond pulses, require a sophisticated arrangement and are fairly costly.

Another novel approach for shortening the pulse from a laser is described in European Pat. No. 42521, published on Dec. 30, 1981, (Hon). This patent uses stimulated backscattering processes, such as Brillouin, Raman or Rayleigh, in a tapered waveguide to compress a laser pulse. An input pulse having a 20 nanosecond pulse width was compressed to a pulse of approximately 2 nanosecond.

Despite all these investigations, the need for a simpler generator for very short pulses is still great in view of possible applications in non-linear optics, photochemistry, plasma X-ray sources and dye laser pumping.

The present invention stems from observations that the stimulated Brillouin scattering process revealed very fast rise times for the backscattered pulses and that it also terminates very rapidly when the incident pulses produced optical breakdown in a scattering medium. The optical breakdown occurs when sufficiently powerful pulses are focussed at a gas/liquid interface.

SUMMARY OF THE INVENTION

It is therefore an object of this invention to provide a simple arrangement to generate a very short laser pulse.

It is a further object of this invention to provide a simple laser system together with a stimulated Brillouin scattering medium to generate a short pulse.

It is still further object of this invention to employ a laser-induced breakdown of a medium to truncate the stimulated Brillouin scattering of a radiation pulse so that the backscattered pulses are shorter in duration than the incident pulses.

These and other objects are achieved by this invention which resides in a method of an apparatus for generating laser pulses.

According to the invention, the method of generating a short laser pulse includes steps of generating an input laser pulse having an intensity to produce stimulated Brillouin scattering in a scattering medium, and transmitting the said input laser pulse toward the said medium as the result of stimulated Brillouin scattering in a direction such as to cause a backscatter thereof from the medium. The method further includes steps of focussing the said input laser pulse at a location substantially coinciding with a surface of the said medium to increase the intensity of the said input laser pulse to such an extent that laser-induced breakdown occurs near the said surface, thus truncating the stimulated Brillouin scattering and directing the backscattered pulse away from the medium. The backscattered pulse has a shorter duration than the input laser pulse.

The pulse generating apparatus of the invention comprises generating means for generating an input laser pulse having an intensity to produce stimulated Brillouin scattering in a scattering medium. The apparatus further includes transmitting means for transmitting the said input radiation pulse toward the said medium, in a direction such as to cause a backscatter thereof from the medium as the result of stimulated Brillouin scattering, and focussing means for focussing the said input laser pulse at a location substantially coinciding with a surface of the said medium to increase the intensity of the said input laser pulse to such an extent that laser-induced breakdown occurs near the said surface, thus truncating the stimulated Brillouin scattering. The apparatus further includes directing means for directing the backscattered pulse away from the medium and the backscattered pulse has a shorter duration than the input radiation pulse.

According to a further embodiment of the invention, a pulse generating apparatus comprises means for producing a highly monochromatic UV radiation pulse, and an excimer laser amplifier to amplify the UV radiation to an intensity sufficiently high so that stimulated Brillouin scattering is produced in a liquid, such as ethylene glycol, when the UV radiation pulse is transmitted therethrough. The liquid surface defines a gas/liquid interface and the UV radiation pulse is transmitted toward the liquid in a direction normal to the interface, to cause a backscatter thereof from the liquid. The apparatus of the invention further includes focussing means for focussing the UV radiation pulse at a location substantially coinciding with the gas/liquid interface so that laser-induced breakdown occurs near the interface, and directing means for directing the backscattered pulse. The backscattered pulse is shorter in duration than the incident UV radiation pulse.

BRIEF DESCRIPTION OF THE DRAWINGS

The foregoing and other objects and features of the invention may be readily understood with reference to the following detailed description taken in conjunction with the accompanying drawings, in which.

DETAILED DESCRIPTION

Figure 1:
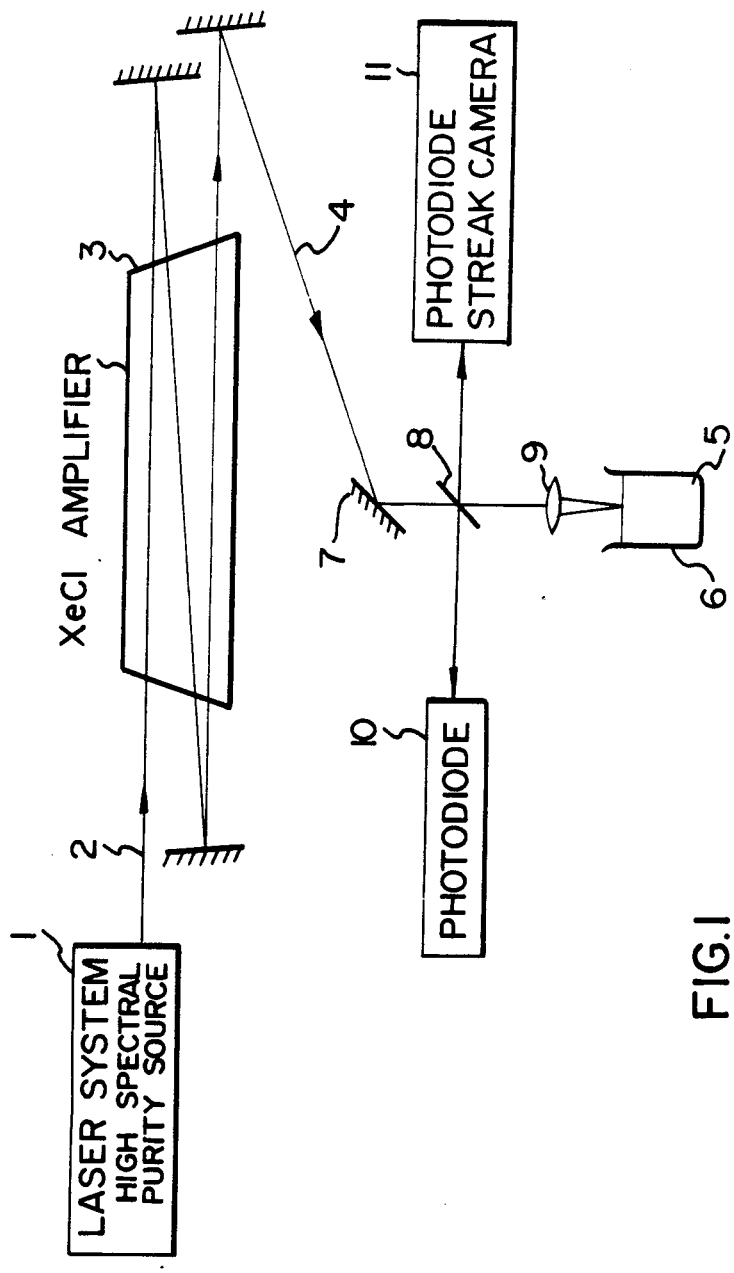
FIG. 1 is a schematic diagram of an embodiment according to the present invention.

Referring now to FIG. 1, there is shown a generalized configuration of a short pulse generator in accordance with the present invention. A high spectral purity source (HSPS) 1 produces high spectral purity UV radiation (wavelength 308 nm) with a maximum energy of 150 $\mu$J per pulse and a linewidth of 0.0004 Å.

The UV radiation 2 is triple-passed through a Lumonics [registered trademark] 291 XeCl gain module 3 to produce diffraction limited pulses 4 of 10 mJ, 10 nanosecond (FWHM—full width half maximum) having a line width of about 100 MHz. The risetime of the amplified UV pulse could be made shorter than 1.5 ns by careful synchronization of the HSPS and the Lumonics gain module. The monochromatic UV pulses are focussed on the surface of a liquid 5 contained in an open quartz cell 6 by means of mirrors 7 and 8, and a lens 9. The maximum intensity at the focus of the lens 9 is calculated to be about 40 GW/cm$^2$. The UV pulses are back scattered from the liquid surface and redirected to detectors such as photodiode 10 and a photodiode and a streak camera 11.

Figure 2:
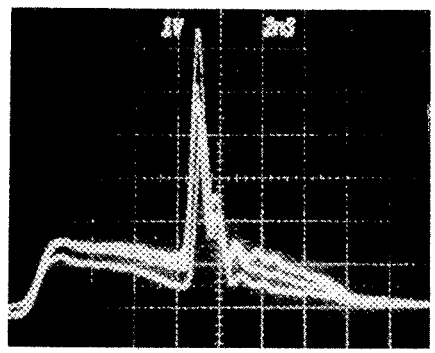
FIG. 2 shows superimposed oscilloscope traces of an incident pulse and stimulated Brillouin backscattered pulses from ethylene glycol, FIGS. 3(a), (b) and (c) are a series of oscilloscope traces showing the variation of the stimulated Brillouin backscattered pulses obtained for three different positions of the focus of the input relative to the gas/liquid interface.

First, the stimulated Brillouin scattering was observed and FIG. 2 shows a number of input and superimposed backscattered pulses obtained when ethylene glycol was used as the scattering medium. The actual time delay between the input and scattered pulses is 6.6 ns less than that which appears in the oscilloscope traces of FIG. 2. However, the low jitter and very short risetime of the backscattered pulse can be seen.

Figure 4:
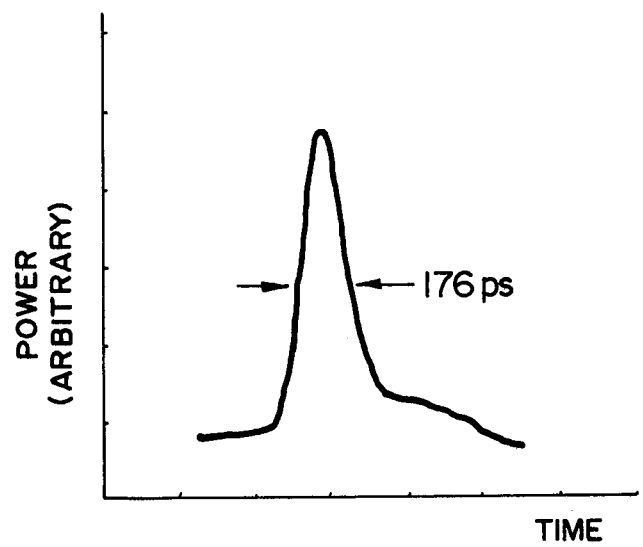
FIG. 4 shows a typical truncated stimulated Brillouin scattered pulse shape recorded with a streak camera.
Figure 3A:
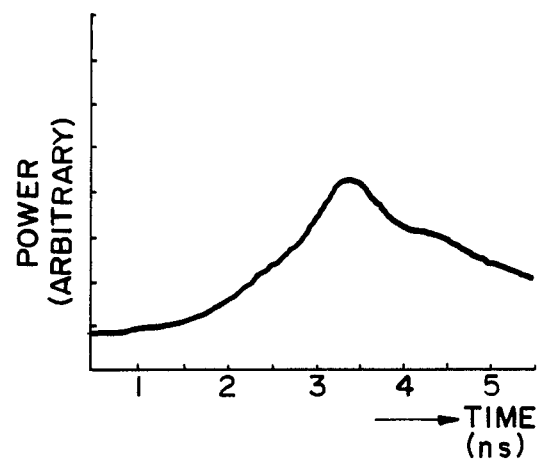
Figure 3B:
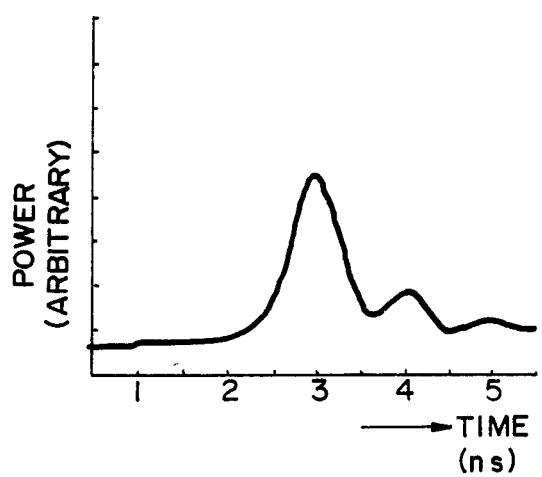
Figure 3C:
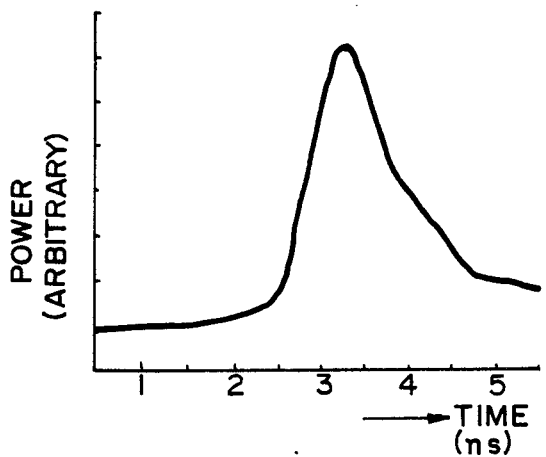

Subsequently, more detailed observations were made as the position of the focus was adjusted in the vicinity of the liquid surface. FIG. 3 shows a series of oscilloscope traces obtained when the backscattered radiation was detected with an ITL [trademark] photodiode ($T_r \approx 200$ ps) and displayed on a Tektronix [trademark] 7104 oscilloscope. In FIG. 3(a) the focus is 2 mm above the surface of the liquid, in FIG. 3(b) the focus is on the surface, and in FIG. 3(c) it is 1 mm below the surface. It is obvious from the ringing of the oscilloscope trace shown in FIG. 3(b) that the detection system cannot follow the true temporal history of the backscattered pulse when the incoming beam is focussed very close to the liquid surface. Thus, more detailed measurements were carried out with a Hamamatsu [trademark] streak camera (model 979) and revealed that reproducible pulses of ~200 ps (FWHM) duration were produced under optimum conditions for pulse shortening. FIG. 4 shows a typical truncated stimulated Brillouin scattering pulse shape. The energy contained in the shortest pulses was typically 2–5 $\mu$J. In this experiment, ethylene glycol was used as a scattering medium but other liquids, such as water, cyclopentane, have been tried with similar results. It is, of course, possible, in principle, to use a suitable solid or gaseous material.

The mechanism which leads to the dramatic pulse shortening observed in these experiments has not been fully determined, however, it appears to be closely related to the occurrence of optical breakdown which is observed when sufficiently powerful UV pulses are focussed at the liquid surface. Short backscattered pulses were only observed when optical breakdown occurred, and by monitoring the beam which propagated through the liquid and the bottom of the quartz cell, it was found that no dramatic increase in absorption accompanied the occurrence of breakdown.

A possible mechanism which may account for the above observations is as follows. Soon after the onset of strong stimulated Brillouin scattering, the high intensity in the focal region initiates avalanche ionization at the gas/liquid interface. Since the remainder of the incoming radiation must pass through this volume, it will experience a rapid phase shift due to the decrease in refractive index associated with creation of the plasma. Assuming that the electron density at the focus increases to a value of ~10$^{20}$ cm$^{-3}$ over a distance of approximately 10$^{-2}$ cm and within a period of 100 ps, radiation at the laser wavelength will undergo a phase shift of ~10$^{11}$ radians/sec. Thus, the radiation arriving beyond the focal volume will no longer satisfy the conditions necessary to maintain the stimulated scattering process. This sudden interruption causes the rapid termination of the backscattered signal, and subsequent effects of the breakdown, e.g. increased beam divergence and degradation of the beam quality, are likely to prevent any recovery of the scattering process during the remainder of the pulse.

In cases where the focus was below the surface of the liquid, no breakdown was observed and with suitable positioning of the focus, strong backscattering occurred for the entire duration of the incident pulse. The absence of breakdown is not surprising since losses due to backscattering will significantly decrease the intensity at the focus, and, even if breakdown were to occur, the fact that ionization would develop in a region beyond the scattering volume prevents the breakdown process from having such a dramatic effect on the radiation which drives the stimulated scattering. Similarly, when the focus is situated above the liquid surface, backscattered pulses which reproduce the entire temporal history of the incident pulse have been observed. However, for the intensities available with the present laser system, breakdown could not be induced under these conditions.

An obvious advantage of this pulse shortening by "truncated Brillouin scattering" is the fact that the frequency shift produced by stimulated Brillouin scattering is relatively small ($\sim 0.1$ cm$^{-1}$) and, thus, the backscattered radiation can be amplified by the same type of excimer laser used to provide the initial narrow linewidth pulse. Preliminary experiments demonstrating the amplification of subnanosecond stimulated Brillouin scattering pulses have been carried out with an additional XeCl gain module and indicates that a further pulse shortening may occur during the amplification process.

We claim:

1. A pulse generating apparatus for generating a short laser pulse comprising:
   generating means for generating an input laser pulse having an intensity to produce stimulated Brillouin scattering in a scattering medium,
   transmitting means for transmitting the said input radiation pulse toward the said medium in a direction such as to cause a backscatter from the medium as the result of stimulated Brillouin scattering,
   focussing means for focussing the said input radiation pulse at a loation substantially coinciding with a surface of the said medium to increase the intensity of the said input laser pulse to such an extent that laser-induced breakdown occurs near the said surface, thus truncating the stimulated Brillouin scattering, and
   directing means for directing the backscattered pulse away from the medium, which backscattered pulse has a shorter duration than the input laser pulse.

2. The apparatus of claim 1 wherein the generating means comprise means for producing a highly monochromatic ultraviolet radiation pulse and an excimer laser amplifier for amplifying the UV radiation pulse.

3. The apparatus of claim 1 wherein the said medium is a liquid and the surface is a gas/liquid interface on which the input laser pulse is focussed.

4. The apparatus of claim 2 wherein the said medium is a liquid, the surface is a gas/liquid interface on which the input radiation pulse is focussed, and the direction is normal to the surface.

5. The apparatus of claim 3 wherein the liquid is a material selected from a group consisting of cyclopentane, water and ethylene glycol.

6. The apparatus of claim 4 wherein the liquid is a material selected from a group consisting of cyclopentane, water and ethylene glycol.

7. The apparatus of claim 6 wherein said input laser pulse has an energy of more than 10 mJ per pulse and a duration of approximately 10 nanoseconds (FWHM) and the backscattered pulse has a duration of less than 200 picoseconds (FWHM).

8. The apparatus of claim 1 further comprising amplifying means for amplifying the backscattered pulse.

9. The apparatus of claim 4 further comprising amplifying means for amplifying the backscattered pulse.

10. A method of generating a short laser pulse comprising steps of:
    generating an input laser pulse having an intensity to produce stimulated Brillouin scattering in a scattering medium,
    transmitting the said input laser pulse, in a direction toward the said medium such as to cause a backscatter thereof from the medium as the result of stimulated Brillouin scattering,
    focussing the said input laser pulse at a location substantially coinciding with a surface of the said medium to increase the intensity of the said input laser pulse to such an extent that laser-induced breakdown occurs near the said surface, thus truncating the stimulated Brillouin scattering,
    directing the backscattered pulse away from the medium, which backscattered pulses has a shorter duration than the input laser pulse.

11. The method of claim 10 wherein the input laser pulse is produced by a laser system which comprises means for producing a highly monochromatic UV radiation pulse and an excimer laser amplifier for amplifying the UV radiation pulse.

12. The method of claim 10 wherein the said medium is a liquid.

13. The method of claim 11 wherein the said medium is a liquid, and the direction is normal to the surface.

14. The method of claim 12 wherein the liquid is a material selected from a group consisting of cyclopentane, water and ethylene glycol.

15. The method of claim 13 wherein the liquid is a material selected from a group consisting of cyclopentane, water and ethylene glycol.

16. The method of claim 10 further comprising a step of amplifying the backscattered pulse.

17. The method of claim 13 further comprising a step of amplifying the backscattered pulse.

18. The method of claim 15 wherein said input laser pulse has an energy of more than 10 mJ per pulse and a duration of approximately 10 nanoseconds (FWHM) and the backscattered pulse has a duration of less than 200 picoseconds (FWHM).

* * * * *